Dec. 13, 1932.  R. W. BENNETT  1,891,041
IRIDOMETER
Filed Dec. 14, 1929   3 Sheets-Sheet 1
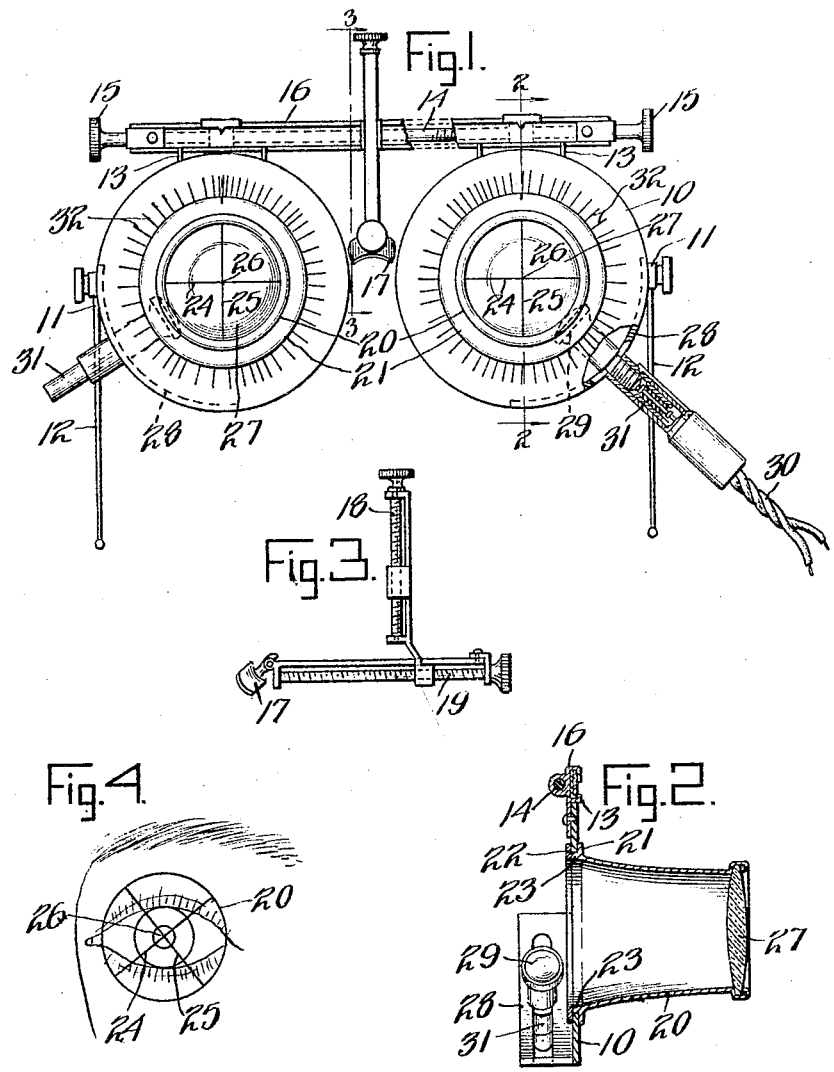
Inventor
Reuel W. Bennett Dec. 13, 1932.  R. W. BENNETT  1,891,041
IRIDOMETER
Filed Dec. 14, 1929   3 Sheets-Sheet 2

Inventor
Reuel W. Bennett
By
Attorney

Dec. 13, 1932.   R. W. BENNETT   1,891,041
IRIDOMETER
Filed Dec. 14, 1929   3 Sheets-Sheet 3

Inventor
Reuel W. Bennett
By
Attorney

Patented Dec. 13, 1932

1,891,041

UNITED STATES PATENT OFFICE

REUEL W. BENNETT, OF INDIANAPOLIS, INDIANA

IRIDOMETER

Application filed December 14, 1929. Serial No. 414,191.

This invention relates to what is called iridiagnosis and its object is to provide means for accurately designating the location of drug signs, infections and lesions of the body as shown in the eye.

Figure 5:
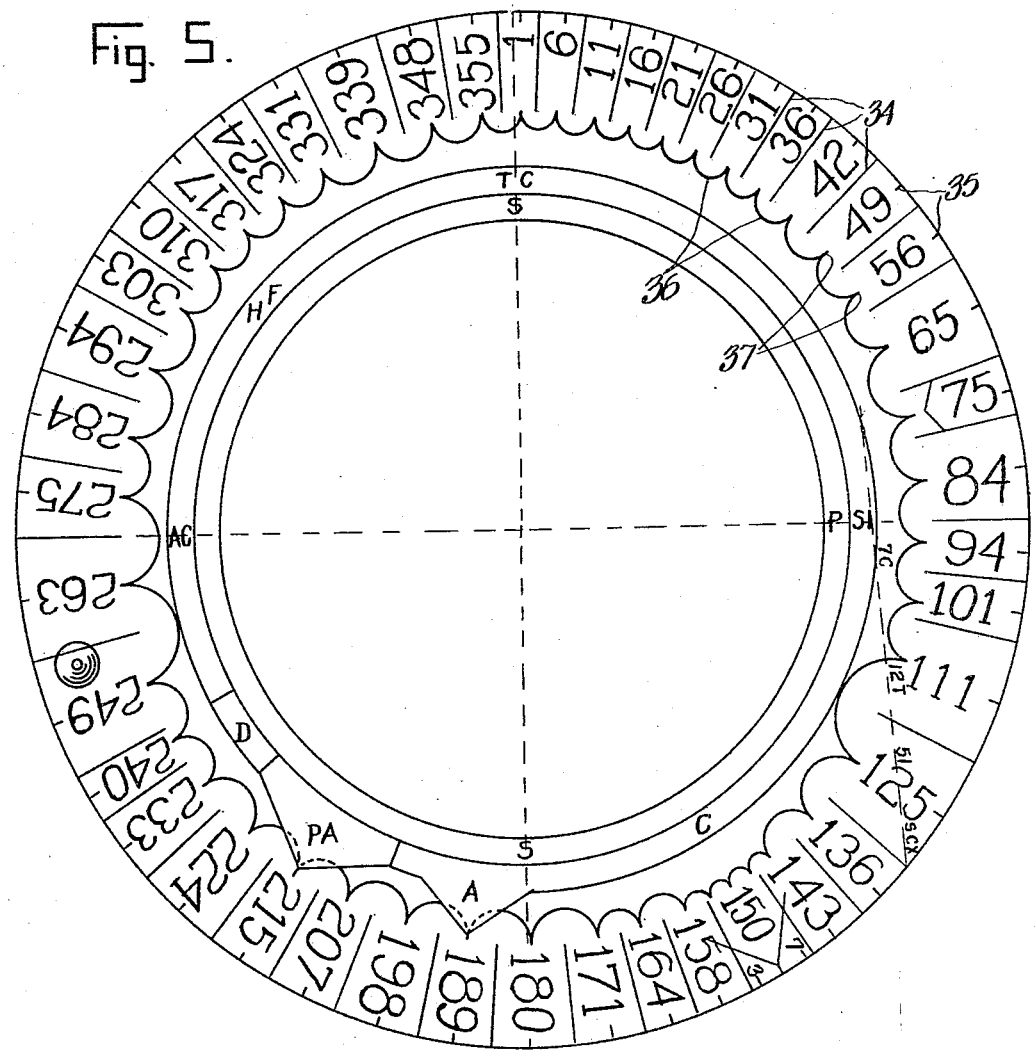
Figure 7:
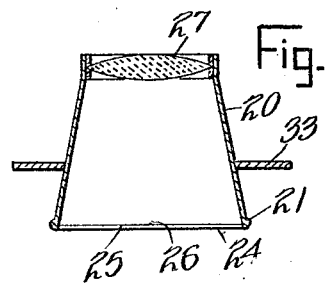
Figure 6:
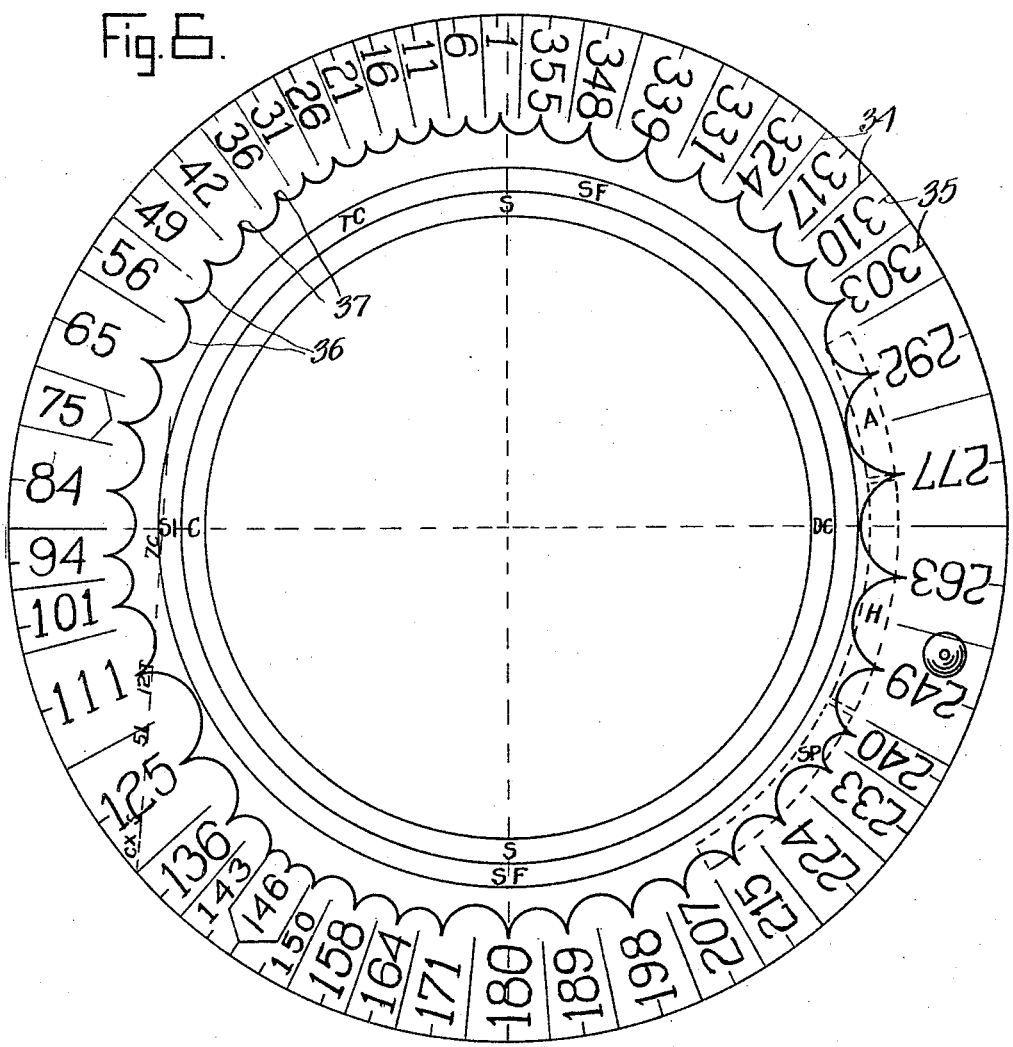

Referring to the accompanying drawings, which are made a part hereof and on which similar reference characters indicate similar parts, Figure 1 is a front view in elevation of my device, Figure 2 is a section on line 2—2 of Fig. 1, Figure 3 is a section on line 3—3 of Fig. 1 showing the bridge and nose adjustment, Figure 4 is a detail showing parts in a definite position before the eye and iris, Figures 5 and 6 show enlarged views of a modified form of dial, and Figure 7 shows the application of this modified dial to an eye piece.

In the drawings numerals 10 indicate ring frames to which may be attached temples 11 having bows 12 by means of which the device may be supported on the patient in the manner of spectacles or glasses. The ring frames 10 have radially extended ears 13 through which may be threaded screws 14 operable by knobs 15. A bar 16 may be supported upon the nose of a patient by means of a nose piece 17 adjustable vertically by means of a manually operable screw 18. Nose piece 17 is adjustable anteriorly, posteriorly by manually operable screw 19. The screw 14 provides means for adjusting the ring frames 10 toward and from each other to position them in front of the eyes of the patient. The adjustable screw 18 enables the physician to adjust the ring frames to the right horizontal position in front of the eyes. Adjustable screw 19 enables the physician to adjust the ring frames to the right focus before the eye. Secured upon the ring frame is an eye piece 20. This may be secured to the ring frame by means of a flanged ring 21 made integral with the eye piece 20 and a removable ring 22 which in conjunction with the flange ring 21 holds the eye piece 20 against a flange 23 within the ring frame 10.

The eye piece 20 has on its inner end spider wires or hairs 24 and 25 placed at right angles to each other to provide a cross spot 26 in the center of the eye piece. In the outer end of the eye piece may be positioned a magnifying glass, or series of lenses 27. On the under side of the ring frame 10 are suitable adjustable brackets 28 for supporting and allowing the light 29 in proper angle before the eye. These bulbs are in circuit with a battery, by means of flexible cord 30 through detachable plug 31. The ring frame 10 may be provided with degree marks 32. Of the cross wires the vertical wire 25 may be normally positioned at the zero degree mark. The eye piece 20 is held on the ring frame so as to permit its manual rotation within the frame.

The operation of the device is as follows:

The device is positioned upon a patient in the manner in which glasses are held. The cross 26 of the wires 24 and 25 is placed over the center of the pupil of the eye. The physician then positions the eye piece so that the wire 25 will be in line with the zero degree mark on the ring frame 10. The eye piece 20 may then be manually rotated until the wire 24 or 25 lies across the lesion, spot or signs on the iris of the eye, as shown in Fig. 3. When in this position the wire will indicate the degree of the circle or the meridian at which the infection occurs, as indicated by the iris of the eye.

In order that the infections, lesions and signs be clearly seen, the electric light bulbs are positioned at the outer edge of the eye and are adjustable through the 68 degree arc on supporting brackets 28. An advantage of this location over past methods of illuminating is that it reveals the vitality and shadows caused by the separation of the stroma or connected tissue of the iris. This light may be movable or adjustable to any position desired in the arc. The magnifying glass 27, of course, aids the physician in accurately positioning the eye piece above the lesion or infection appearing on the iris. The lens or lenses 27 also afford proper magnification of the iris. This enables the physician to record most accurately the location of the infection thus shown.

In Figures 5, 6 and 7 is shown a modified form of dial plates which may be used upon eye pieces of known construction. In this form a ring 33 is divided into areas which are located on the areas designated by the numerals 1, 6, 11, etc. reading clockwise for the right eye and counter clockwise for the left eye. The markings 34 designate the boundaries of the areas and the short marks 35 designate approximately the center of the areas. The semi-circular markings 36 terminate in points 37 which are approximately at the centers of the areas. The plates 33 may be placed on the eye piece 20 as shown in Fig. 9 and may be rotated with the eye piece. When either of the cross wires 24 or 25 is across the involved part of the eye the examiner may read the position of the plate as designated by the markings 1, 6, 11 etc. and see in what area the involved part lies.

It will be obvious to those skilled in the art that various changes may be made in my device without departing from the spirit of the invention, and I, therefore, do not limit myself to what is shown in the drawings and described in the specification, but only as set forth in the appended claims. For example, this also covers attachments made to or stationary with the head rest and devices with illumination from 110 volt currents through specially fitted devices that afford parallel light and thus prevent any shadows on the cornea of the eye, as is provided for in the lens system of the light bulb 29.

Having thus fully described my said invention, what I claim as new and desire to secure by Letters Patent, is:

1. A device of the kind described comprising ring frames adjustable toward and from each other, eye pieces rotatably mounted in the ring frames, the eye pieces having magnifying lenses in one end, wires crossed at right angles to each other mounted in the other end, the ring frame being graduated to indicate degree marks, rotation of the eye pieces serving to position any one of the cross wires to any predetermined angular position, the degree marks indicating the position to which it is turned, substantially as set forth.

2. A device of the kind described comprising ring frames adjustable toward and from each other, eye pieces rotatably mounted in the ring frames, the eye pieces having magnifying lenses in one end, wires crossed at right angles to each other mounted in the other end, the ring frame being graduated to indicate degree marks, rotation of the eye pieces serving to position any one of the cross wires to any predetermined angular position, the degree marks indicating the position to which it is turned, the eye pieces being held in the ring frames by means of integral flanges which cooperate with the ring frame, and removable flanges secured to the eye pieces, substantially as set forth.

3. The combination with a chart of the kind described and for the purpose described, of ring frames adjustable toward and from each other, eye pieces rotatably mounted on the ring frames, the ring frame being marked to indicate degrees thereon, the eye pieces carrying magnifying lenses in one end and wires mounted at right angles to each other in the other end, rotation of the eye pieces serving to position any one of the wires in any desired angular position, the indicia on the ring frames indicating the angular position to which the eye piece is turned for the purpose described, substantially as set forth.

In witness whereof, I have hereunto set my hand at Indianapolis, Indiana, this 10th day of December, A. D. nineteen hundred and twenty-nine.

REUEL W. BENNETT.